(12) United States Patent
Faibish et al.

(10) Patent No.: US 8,868,576 B1
(45) Date of Patent: Oct. 21, 2014

(54) STORING FILES IN A PARALLEL COMPUTING SYSTEM BASED ON USER-SPECIFIED PARSER FUNCTION

(75) Inventors: Sorin Faibish, Newton, MA (US); John M. Bent, Los Alamos, NM (US); Percy Tzelnic, Concord, MA (US); Gary Grider, Los Alamos, NM (US); Adam Manzanares, Hopkinton, MA (US); Aaron Torres, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 13/536,369

(22) Filed: Jun. 28, 2012

(51) Int. Cl.
*G06F 17/30* (2006.01)
(52) U.S. Cl.
CPC .................................. *G06F 17/3056* (2013.01)
USPC ........... 707/755; 707/764; 707/770; 707/809; 707/810
(58) Field of Classification Search
CPC .................... G06F 17/30445; G06F 17/30194; G06F 17/30563; G06F 17/30569; G06F 17/30584; G06F 3/067
See application file for complete search history.

(56) References Cited

U.S. PATENT DOCUMENTS

| | | | |
|---|---|---|---|
| 7,712,088 B2 | 5/2010 | Sonkin et al. | |
| 8,352,429 B1 * | 1/2013 | Mamidi et al. | 707/640 |
| 2003/0028509 A1 * | 2/2003 | Sah et al. | 707/1 |
| 2008/0215528 A1 | 9/2008 | Sedlar | |
| 2011/0302151 A1 * | 12/2011 | Abadi et al. | 707/714 |
| 2011/0302226 A1 * | 12/2011 | Abadi et al. | 707/825 |
| 2012/0078951 A1 * | 3/2012 | Hsu et al. | 707/769 |
| 2012/0239612 A1 * | 9/2012 | George et al. | 707/602 |

OTHER PUBLICATIONS

Bent et al., PLFS: A Checkpoint Filesystem for Parallel Applications, International Conference for High Performance Computing, Networking, Storage and Analysis 2009 (SC09), Nov. 2009.
EMC Fast Cache, http://www.emc.com/collateral/software/white-papers/h8046-clariion-celerra-unified-fast-cache-wp.pdf, Oct. 2011.

* cited by examiner

*Primary Examiner* — Anh Tai Tran
(74) *Attorney, Agent, or Firm* — Ryan, Mason & Lewis, LLP

(57) ABSTRACT

Techniques are provided for storing files in a parallel computing system based on a user-specified parser function. A plurality of files generated by a distributed application in a parallel computing system are stored by obtaining a parser from the distributed application for processing the plurality of files prior to storage; and storing one or more of the plurality of files in one or more storage nodes of the parallel computing system based on the processing by the parser. The plurality of files comprise one or more of a plurality of complete files and a plurality of sub-files. The parser can optionally store only those files that satisfy one or more semantic requirements of the parser. The parser can also extract metadata from one or more of the files and the extracted metadata can be stored with one or more of the plurality of files and used for searching for files.

20 Claims, 5 Drawing Sheets

```
/410
int
parse_data(const char *buffer, map<string,long long> &keyvalues) {
  long long max_humidity = -1;
  foreach record in buffer {
    if record.humidity > max_humidity max_humidity = record.humidity;
  }
  keyvalues["max_humidity"] = max_humidity;
  return 0;
}
//420
 (int) transducer_pointer(const char *, size_t) = parse_data;
size_t block_size = 1048576;
Plfs_fd *pfd = plfs_open("/path/to/file", O_WRONLY | O_CREAT);
plfs_register_transducer(pfd, transducer_pointer);

//430
int
plfs_register_transducer(Plfs_fd *pfd,
         (int) func_ptr(const char *, size_t),
         size_t block_size )
{
  map<string,long long> *key_vals = new map<string, long long>;
  plfs_transducer *ptran = new plfs_transducer(func_ptr,block_size, key_vals);
  pfd->transducers->push_back(ptran);
}
```

FIG. 4B ⟋400

```
//440
int
plfs_write(Plfs_fd *pfd, const char *buffer, size_t len, off_t offset) {
  datalog = pfd->datalog;
  datalog->append(buffer, len);
  foreach transducer T in pfd {
    foreach data block B in datalog of size T->block_size {
      T->func_ptr(B,T->map);
      pfd->update_metadata(T->map);
    }
  }

........
}
//450
foreach (block B where "max_humidity" > 73.0) run/usr/bin/reducer B
```

STORING FILES IN A PARALLEL COMPUTING SYSTEM BASED ON USER-SPECIFIED PARSER FUNCTION

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

Storage tiering techniques are increasingly used in parallel computing environments to more efficiently store the vast amounts of information. For example, the Symmetrix system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

MapReduce is a programming model for processing large data sets, such as distributed computing tasks on clusters of computers. During the "map" step, a master node receives the input, divides it into smaller sub-problems, and distributes the smaller sub-problems to worker nodes. The worker nodes process the smaller problems, and pass the answer back to its master node. During the "reduce" step, the master node collects the answers to the sub-problems and combines the answers to form the output (i.e., the answer to the initial problem).

The map phase acts as a filter across all data blocks. The filtered blocks are then applied to the reducer phase. For example, consider climate data that has been loaded into a map-reduce storage file system. Assume that there are 100 blocks of data spread across 100 map-reduce nodes and the application wants to process data blocks for which the air pressure is greater than a predefined threshold, T. If there are two blocks matching this criteria, then the map job will read all 100 blocks and forward only the two matching blocks to the reducer. The remaining 98 blocks were read only to discover that they did not satisfy the criteria. Thus, a complete search of the entire data set (i.e., a map-reduce function applied on all of the data) must be performed while only a small percentage of the data blocks are actually needed.

A need therefore exists for improved data analytic techniques for data distributed across a plurality of flash based storage nodes in a hierarchical storage tiering system.

SUMMARY

Embodiments of the present invention provide improved techniques for storing files in a parallel computing system based on a user-specified parser function. In one embodiment, a method is provided for storing a plurality of files generated by a distributed application in a parallel computing system, wherein the plurality of files comprise one or more of a plurality of complete files and a plurality of sub-files. The method comprises the steps of obtaining a parser from the distributed application for processing the plurality of files prior to storage; and storing one or more of the plurality of files in one or more storage nodes of the parallel computing system based on the processing by the parser. For example, the parser can optionally store only those files that satisfy one or more semantic requirements of the parser.

According to a further aspect of the invention, the parser can extract metadata from one or more of the files and the extracted metadata can be stored with one or more of the plurality of files. The extracted metadata comprises, for example, one or more key-value pairs from data in one or more of the plurality of files. In one exemplary implementation, the extracted metadata comprises data-aware semantic information from one or more of the plurality of files.

According to another aspect of the invention, the extracted metadata can be used to process a query. For example, the extracted metadata can be searched to identify one or more files associated with the metadata that satisfy one or more semantic requirements. In addition, the parser can optionally identify one or more storage nodes where the plurality of files should be stored. The parser can also identify one or more tiers of a multi-tier storage system for storing one or more of the plurality of files.

Advantageously, illustrative embodiments of the invention store files in a parallel computing system based on a user-specified parser function. The information processed by the parser function reduces data processing and transfer bandwidth costs, and preserves valuable disk space.

These and other features and advantages of the present invention will become more readily apparent from the accompanying drawings and the following detailed description.

BRIEF DESCRIPTION OF THE DRAWINGS

FIGS. 4A and 4B, collectively, illustrate exemplary pseudo code that incorporates aspects of the present invention.

DETAILED DESCRIPTION

Figure 1:
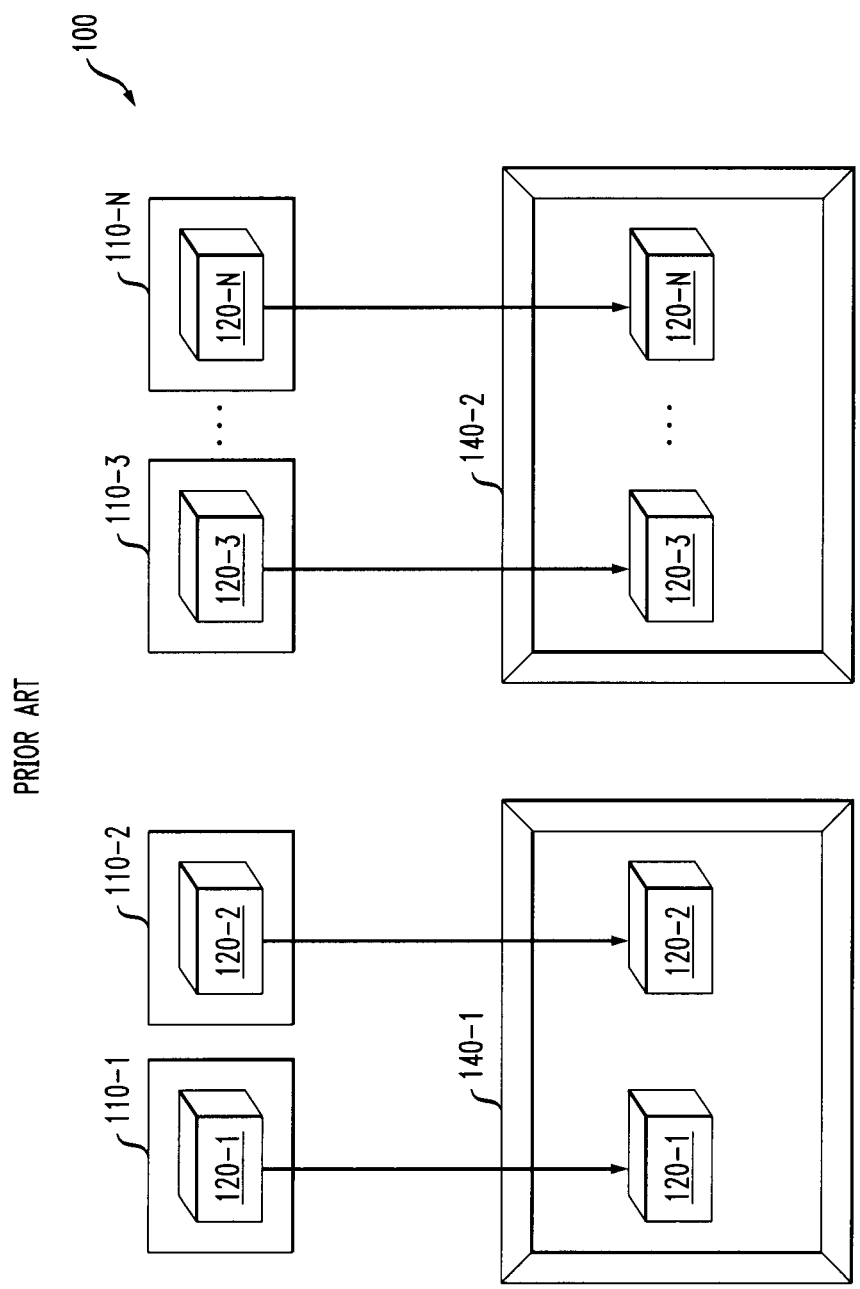
FIG. 1 illustrates an exemplary conventional hierarchical storage tiering system.

The present invention provides data analytic techniques for data distributed across a plurality of storage nodes in a hierarchical storage tiering system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "files" shall include complete files and portions of files, such as sub-files or shards.

According to one aspect of the invention, unnecessary reads associated with data that does not satisfy desired criteria are eliminated by parsing the data as the data streams into the storage system. In this manner, with knowledge of the contents of the data, a statistical summary can be embedded in a metadata file about the data itself.

Continuing the above climate example, the maximum air pressure of every data block can be obtained by parsing the data blocks as they are written into the flash based storage nodes in a hierarchical storage tiering system. The search application can then bypass the map phase and apply a reduce phase with a query of the metadata to identify the two relevant data blocks. Thus, the reading of the 98 data blocks is transformed into a metadata query.

Storage tiering techniques are increasingly used in parallel computing environments to more efficiently store the vast amounts of information. For example, the Symmetrix system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

The present invention recognizes that storage tiering provides a new opportunity for data analytics as the data is temporarily available in the flash storage tier before it is migrated to the higher capacity disk-based tier. In one exemplary embodiment, the middleware file system that parses the data blocks as they are written into the flash based storage nodes is implemented using the Fully Automated Storage Tiering (FAST) system of EMC Corporation and the Parallel Log-Structured File System (PLFS), as modified herein to provide the features and functions of the present invention. See, for example, "EMC FAST Cache," http://www.emc.com/collateral/software/white-papers/h8046-clariion-celerra-unified-fast-cache-wp.pdf, or John Bent et al., "PLFS: A Checkpoint Filesystem for Parallel Applications," Intl Conf. for High Performance Computing, Networking, Storage and Analysis 2009 (SC09) (November 2009), each incorporated by reference herein. Generally, conventional PLFS improves the efficiency of checkpoint techniques for parallel applications by inserting an interposition layer into the existing storage stack to rearrange the problematic access pattern associated with checkpoints.

FIG. 1 illustrates an exemplary conventional hierarchical storage tiering system 100. As shown in FIG. 1, the hierarchical storage tiering system 100 comprises a plurality of compute nodes 110-1 through 110-N (collectively, compute nodes 110) each having a portion 120-1 through 120-N of a distributed data structure. For example, four compute nodes 110-1 through 110-4 can each process climate data for a different quadrant of a country, such as northeast, northwest, southeast and southwest quadrants. The compute nodes 110 optionally store the portions 120 of the distributed data structure in one or more nodes of the exemplary hierarchical storage tiering system 100, such as two exemplary flash based storage nodes 140-1, 140-2 (e.g., burst buffer nodes). In addition, the exemplary hierarchical storage tiering system 100 optionally comprises one or more hard disk drives (not shown).

Figure 2:
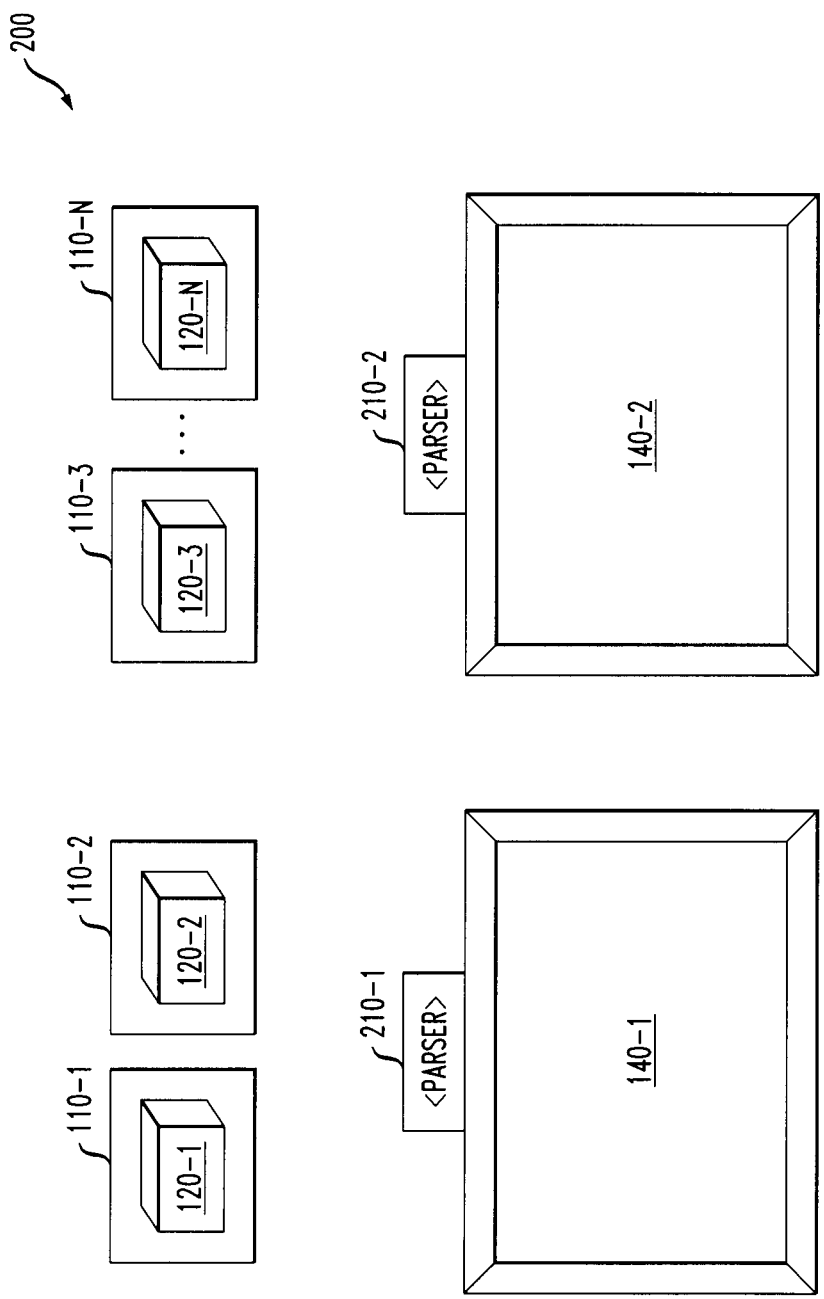
FIG. 2 illustrates an exemplary hierarchical storage tiering system in accordance with the present invention.

FIG. 2 illustrates an exemplary hierarchical storage tiering system 200 in accordance with the present invention. As shown in FIG. 2, the hierarchical storage tiering system 200 comprises the plurality of compute nodes 110-1 through 110-N each having a portion 120-1 through 120-N of a distributed data structure. In addition, the plurality of burst buffer nodes, such as two flash based storage nodes 140-1, 140-2, store information from the compute nodes 110.

According to one aspect of the present invention, one or more storage nodes, such as the flash based storage nodes 140-1, 140-2 (e.g., burst buffer nodes), has one or more associated parser functions 210-1, 210-2 that parse the data blocks 120 as they are written into the corresponding flash based storage node 140-1, 140-2. The parser functions 210-1, 210-2 may be executed, for example, by a processor, a microprocessor, a microcontroller, an application-specific integrated circuit (ASIC), a field-programmable gate array (FPGA) or other type of processing circuitry, as well as portions or combinations of such circuitry elements.

According to a further aspect of the invention, the parser function 210-1, 210-2 extracts data-aware semantic information from the data blocks 120. For example, the parser function 210 can identify minimum and/or maximum values, and/or determine the average, mean or median of the data 120. In further variations, the exemplary parser function 210 can identify correlations between multiple fields and/or create histograms or counts of interesting objects. In one exemplary embodiment, the extracted data is recorded by the parser function 210 as a name-value pair, key-value pair, field-value pair and/or attribute-value pair (collectively referred to herein as key-value pairs).

In this manner, when the data blocks 120 are written to the burst buffers 140, the data is streamed through the parser functions 210 that add descriptive metadata to each block 120.

Figure 3:
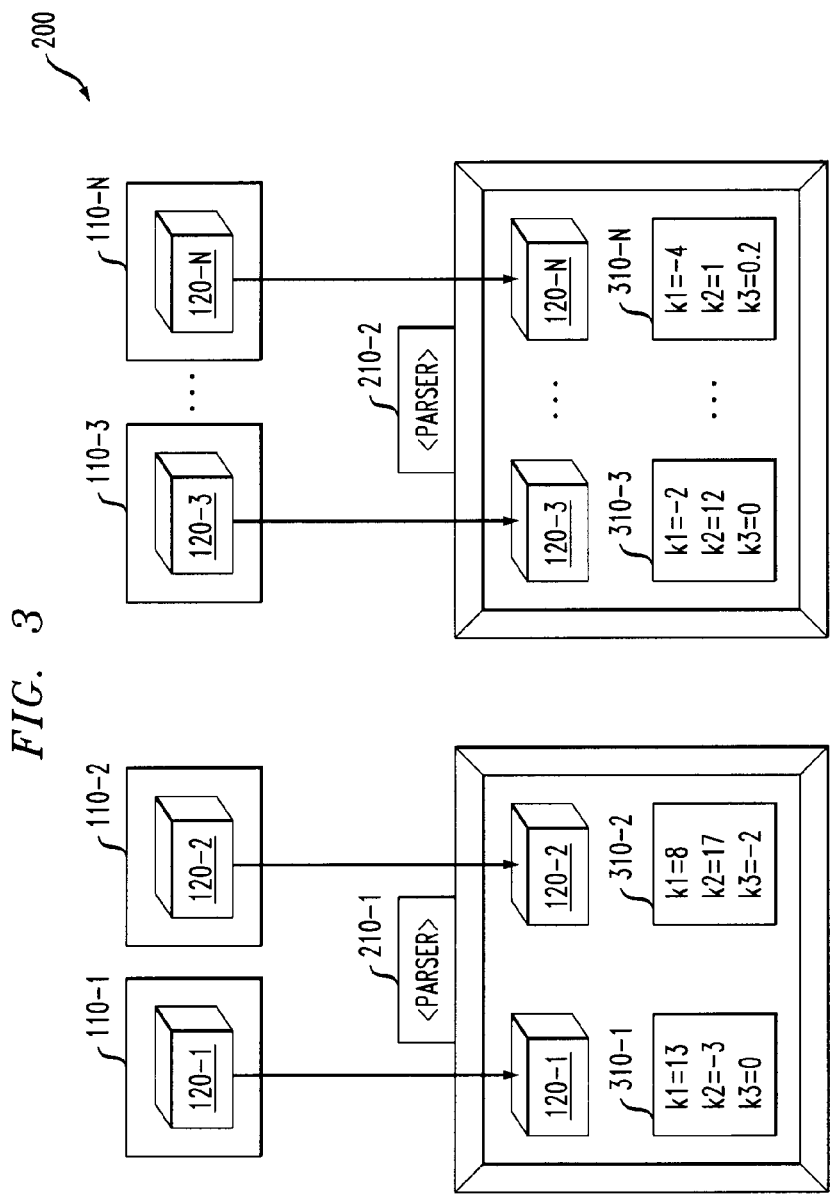
FIG. 3 illustrates the extraction of key-value metadata from each block by the hierarchical storage tiering system of FIG. 2.

FIG. 3 illustrates the extraction of key-value metadata 310 from each block 120 by the hierarchical storage tiering system 200 of FIG. 2. As shown in FIG. 3, when the data blocks 120 are written to the burst buffers 140, the data is streamed through the parser functions 210. The parser functions 210 add key-value metadata 310-$i$, such as k1-k3, to each block 120-$i$.

As previously indicated, the additional metadata 310 provided by the parser function 210 allows the reduce phase to skip data blocks 120 that are not interesting (i.e., that do not satisfy some constraint on the metadata 310). For example, the reduce phase may only be interested in blocks where k1>10 in which case it need only read the block 120-1 and no others (thereby eliminating approximately 75% of the work).

Once the metadata 310-$i$ has been stored for each data block 120-$i$ in accordance with the present invention, querying the key-value pairs is a faster traversal through a relatively small amount of metadata 310 thereby potentially eliminating a much slower traversal through a large amount of data. In a further variation, the metadata 310-$i$ can be evaluated to determine if the associated data block 120-*i* should be stored in the flash based storage nodes or the hard disk drive (HDD) archival nodes.

FIGS. 4A and 4B, collectively, illustrate exemplary pseudo code 400 that incorporates aspects of the present invention. As shown in FIG. 4A, a section 410 comprises the parse function 310 that the user creates to parse the data blocks 120. In addition, a section 420 illustrates how the user registers their parse function 310. First, the user obtains a pointer to their function 310. Second, the block size is set that PLFS uses to call back to the user function 310. Third, the PLFS file is opened. Finally, the function pointer is associated with the file.

In addition, the exemplary pseudo code 400 in FIG. 4A comprises a section 430 illustrating what the PLFS register_tranducer looks like.

As shown in FIG. 4B, a section 440 comprises a section 440 illustrating how PLFS handles the registered function 310 during write operations. The data 120 is stored to a buffer and then for each transducer, the transducer is called and all the key-values that the transducer produces are saved. Finally, the remaining operations performed by conventional PLFS for a write operation are performed (" . . . ").

Finally, as shown in FIG. 4B, in a section 450, before the read operation, the app tells the scheduler what it wants, and then the scheduler queries PLFS to find out which blocks 120 are required. The user creates a map-reduce-like job description file with sql-like queries, and the scheduler then uses the map-reduce-like job description file to obtain a list of blocks 120 from PLFS matching the user query.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for storing a plurality of files created by a distributed source application and sent by said distributed source application to a parallel computing system for storage, wherein said plurality of sent files comprise one or more of a plurality of complete files and a plurality of sub-files, said method comprising the steps of:
obtaining a parser with said plurality of sent files from said distributed source application for processing said plurality of sent files prior to storage;
applying said parser to said plurality of sent files prior to storage to extract metadata from said plurality of sent files;
obtaining said metadata extracted by said parser from one or more of said plurality of sent files; and
storing said obtained metadata with one or more of said plurality of sent files in a file system on one or more storage nodes within said parallel computing system based on said processing by said parser.

2. The method of claim 1, wherein said storing step further comprises the step of storing only sent files that satisfy one or more semantic requirements of said parser.

3. The method of claim 1, wherein said extracted metadata comprises one or more key-value pairs from data in one or more of said plurality of sent files.

4. The method of claim 1, wherein said extracted metadata comprises data-aware semantic information from one or more of said plurality of sent files.

5. The method of claim 1, further comprising the step of processing a query using said extracted metadata.

6. The method of claim 1, further comprising the step of searching said extracted metadata to identify one or more sent files associated with said metadata that satisfy one or more semantic requirements.

7. The method of claim 1, wherein said parser identifies one or more of said storage nodes where said plurality of sent files should be stored.

8. The method of claim 1, wherein said parser identifies one or more tiers of a multi-tier storage system for storing one or more of said plurality of files.

9. A computer program product comprising a non-transitory tangible processor-readable recordable storage medium having encoded therein executable code of one or more software programs, wherein the one or more software programs when executed by a processor of a processing device implement the steps of the method of claim 1.

10. An apparatus for storing a plurality of files created by a distributed source application and sent by said distributed source application to a parallel computing system for storage, wherein said plurality of sent files comprise one or more of a plurality of complete files and a plurality of sub-files, comprising:
a memory; and
at least one hardware device operatively coupled to the memory and configured to:
obtain a parser with said plurality of sent files from said distributed source application for processing said plurality of sent files prior to storage;
apply said parser to said plurality of sent files prior to storage to extract metadata from said plurality of sent files;
obtain said metadata extracted by said parser from one or more of said plurality of sent files; and
store said obtained metadata with one or more of said plurality of sent files in a file system on one or more storage nodes within said parallel computing system based on said processing by said parser.

11. The apparatus of claim 10, wherein said at least one hardware device is further configured to store only sent files that satisfy one or more semantic requirements of said parser.

12. The apparatus of claim 10, wherein said extracted metadata comprises data-aware semantic information from one or more of said plurality of sent files.

13. The apparatus of claim 10, wherein said at least one hardware device is further configured to process a query using said extracted metadata.

14. The apparatus of claim 10, wherein said parser identifies one or more of said storage nodes where said plurality of sent files should be stored.

15. The apparatus of claim 10, wherein said parser identifies one or more tiers of a multi-tier storage system for storing one or more of said plurality of sent files.

16. The apparatus of claim 10, wherein said parser executes on one or more nodes of a multi-tier storage system.

17. A data storage system for storing a plurality of files created by a distributed source application and sent by said distributed source application to a parallel computing system for storage, wherein said plurality of sent files comprise one or more of a plurality of complete files and a plurality of sub-files, comprising:
- a hardware processing unit for processing said plurality of sent files prior to storage to extract metadata from said plurality of sent files using a parser obtained with said plurality of sent files from said distributed source application and for obtaining metadata extracted by said parser from one or more of said plurality of sent files; and
- a storage medium for storing said obtained metadata with one or more of said plurality of sent files in a file system on one or more storage nodes within said parallel computing system based on said processing by said parser.

18. The data storage system of claim 17, wherein only said sent files that satisfy one or more semantic requirements of said parser are stored.

19. The data storage system of claim 17, wherein said extracted metadata comprises data-aware semantic information from one or more of said plurality of sent files.

20. The data storage system of claim 17, wherein said processing unit is further configured to process a query using said extracted metadata.

\* \* \* \* \*